June 16, 1942.                A. D. MacLEAN                2,286,188
                          FLUID DISTRIBUTION SYSTEM
                    Filed Sept. 16, 1938         5 Sheets-Sheet 1

Fig. 1.

INVENTOR.
Allen D. MacLean.
BY Lewis D. Konigsford
ATTORNEY.

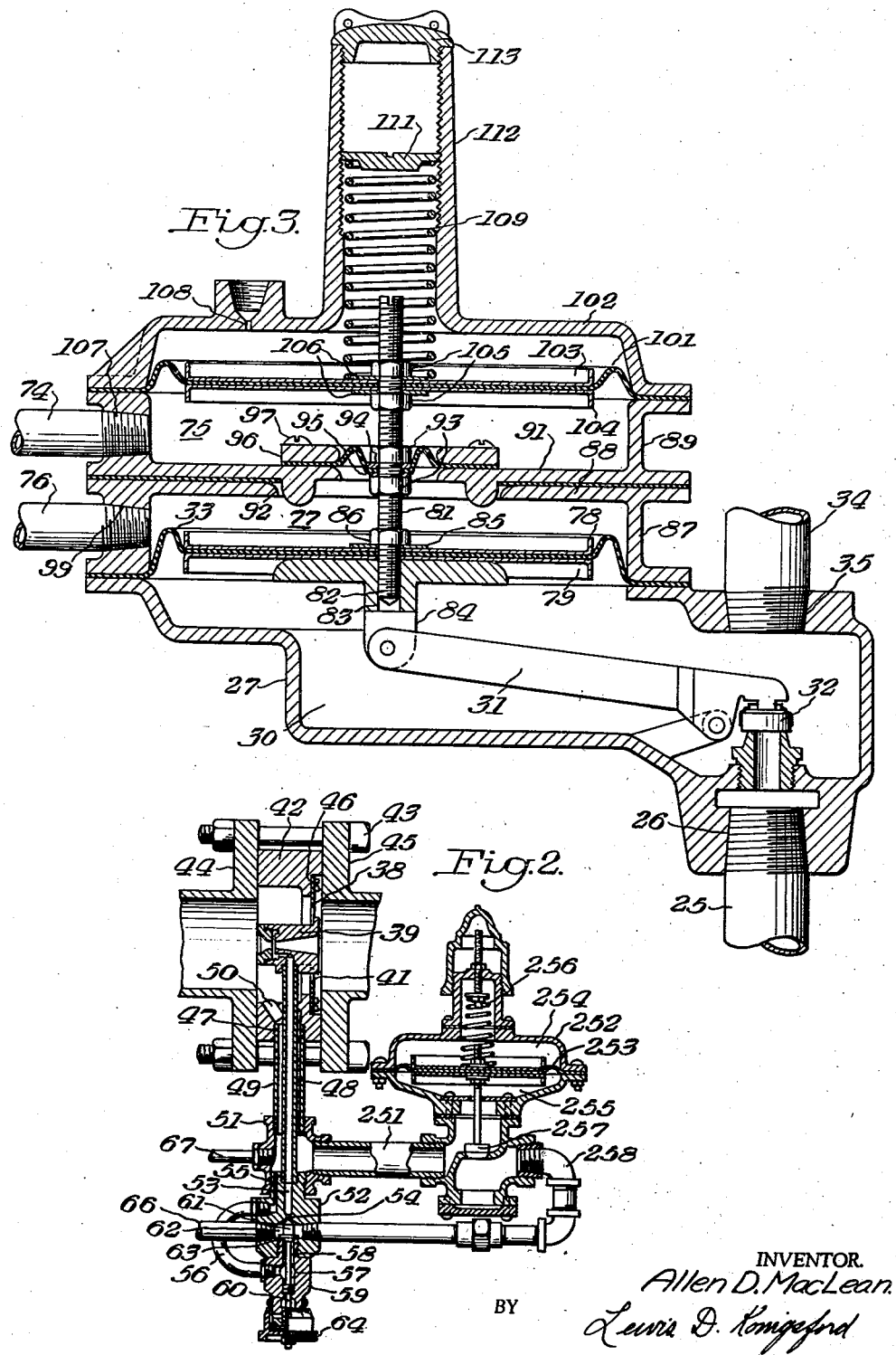

June 16, 1942.  A. D. MacLEAN  2,286,188
FLUID DISTRIBUTION SYSTEM
Filed Sept. 16, 1938  5 Sheets-Sheet 3
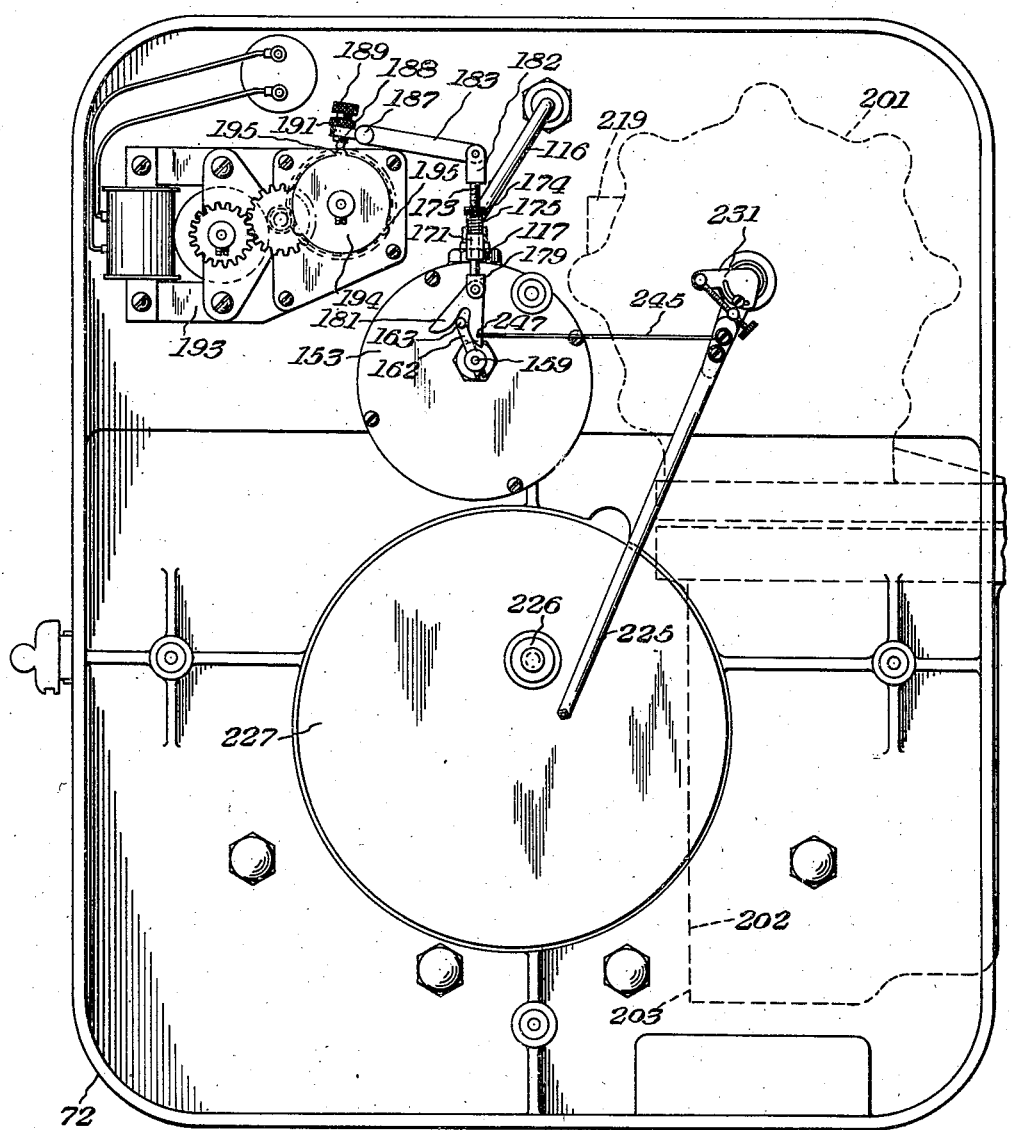
Fig. 4.
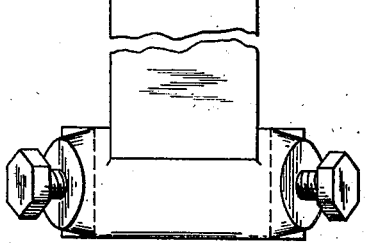
INVENTOR.
Allen D. MacLean.
BY Lewis D. Konigsford
ATTORNEY.

June 16, 1942.                 A. D. MacLEAN                         2,286,188
                          FLUID DISTRIBUTION SYSTEM
                           Filed Sept. 16, 1938          5 Sheets-Sheet 4
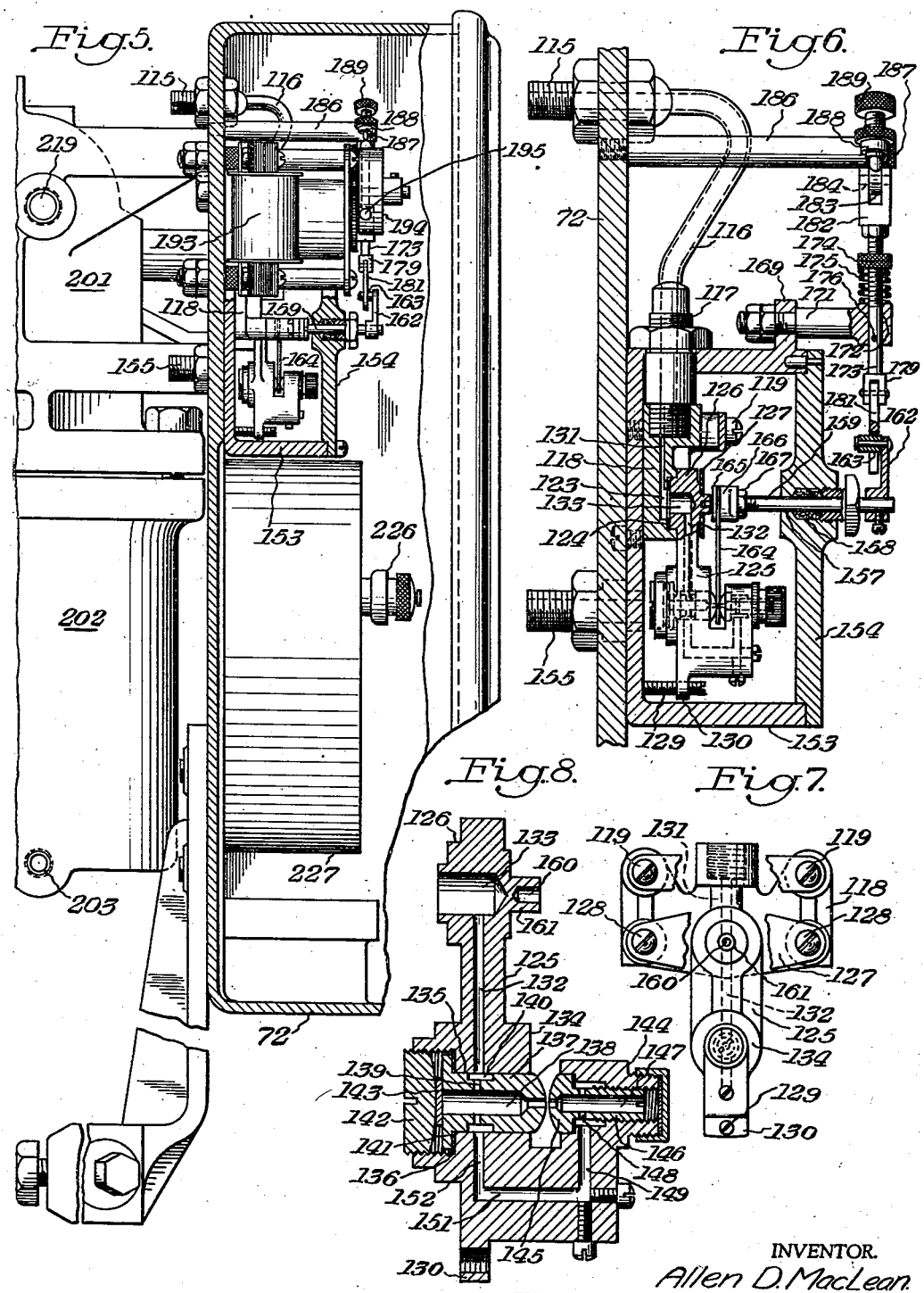
INVENTOR.
Allen D. MacLean
BY Lewis D. Kingsford
ATTORNEY.

June 16, 1942.  A. D. MacLEAN  2,286,188
FLUID DISTRIBUTION SYSTEM
Filed Sept. 16, 1938  5 Sheets-Sheet 5
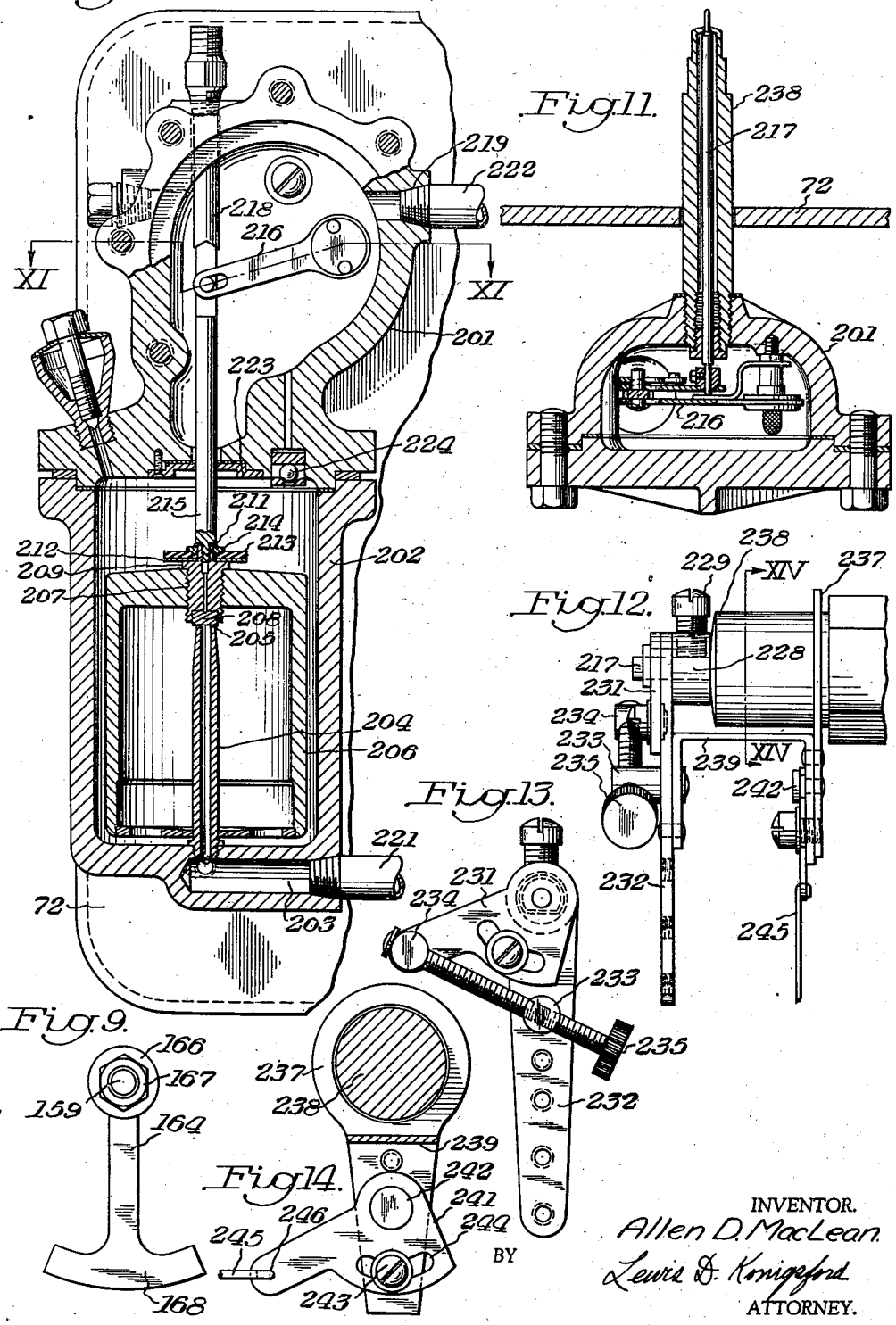
INVENTOR.
Allen D. MacLean
BY Lewis D. Konigsford
ATTORNEY.

Patented June 16, 1942

2,286,188

UNITED STATES PATENT OFFICE 2,286,188

FLUID DISTRIBUTION SYSTEM

Allen D. MacLean, Pittsburgh, Pa., assignor to Pittsburgh Equitable Meter Company, Pittsburgh, Pa., a corporation of Pennsylvania Application September 16, 1938, Serial No. 230,343

19 Claims. (Cl. 50—16)

This invention relates to fluid pressure distribution systems, and particularly to gas distribution systems in which it is desired to automatically vary the pressure in the distribution main in accordance with the consumer demand.

In the pressure control system disclosed in Patent No. 2,093,842, issued September 21, 1937, to Allen D. MacLean and Fritz Niesemann, a main regulator is controlled by the flow in a differential pressure producing device to increase or boost the outlet pressure and a limiting device prevents excessive boosts in pressure. It has been found that in pressure control systems governed by rate of flow under certain conditions there is a cumulative action whereby pressure boosts occur in wide swings, that is, once the pressure begins to build up it continues to increase until the maximum setting is reached, whereupon the main regulator shuts off until the normal minimum pressure is resumed, whereupon the pressure again builds up to the maximum, this series of swings continuing for long periods. Systems of this type, therefore, have the disadvantage that they tend to maintain the extreme pressures instead of intermediate pressures. Furthermore, in such systems employing many regulators it becomes difficult to properly distribute the load among the various regulators.

Accordingly, it is an object of the present invention to provide a pressure regulating system wherein pressure changes are made as required in successive increments whereby wide fluctuations in pressure and swings are avoided.

It is a further object of the invention to provide a pressure regulating system having a plurality of regulators in which the load may be divided among the various regulators.

A further object of the invention is the provision of a pressure regulating system in which the pressure in the main is increased sufficiently to compensate for the increased flow required at periods of maximum demand and which will maintain a predetermined normal pressure in the main at periods of low demand.

A further object of the invention is the provision of a fluid pressure regulator system which will not be subject to surges of pressure, and may be adjusted to compensate or nullify surges which otherwise would occur.

A further object of the invention is the provision of an automatic pressure regulating system in which the outlet pressure can be automatically increased without swinging or surging independent of the storage capacity or resistance of the distribution system.

A further object is to provide a pressure regulating system in which the controlling valve is actuated by a change in pressure followed by a period of pressure stability.

A further object of the invention is the provision of a pressure regulating system in which the boost may be developed in any predetermined manner dependent on the rate of flow or any other desired function of the apparatus.

The invention will be described in connection with the accompanying drawings wherein I have shown a preferred embodiment of the invention by way of illustration, and wherein:

Figure 1 is a partly diagrammatic view showing a preferred modification of the invention, Figure 2 is an enlarged view of a preferred pressure differential producing device and boost limiting mechanism, Figure 3 is an enlarged view in section of the differential responsive regulator, Figure 4 is a front elevation of the vane controller mechanism and housing, Figure 5 is a side view with parts broken away of the vane controller mechanism and housing, Figure 6 is a section view of the vane controller mechanism and housing, certain parts being shown in elevation, Figure 7 is an elevation view of the nozzle bracket, Figure 8 is an enlarged sectional view of the nozzle case, Figure 9 is a side view of the vane, Figure 10 is a rear sectional view of the manometer and float, Figure 11 is a horizontal sectional view of the float operated shaft, Figure 12 is an elevation showing the float operated shaft and mechanism operated thereby, Figure 13 is a side view of Figure 12, and Figure 14 is a side view of the cam adjusting mechanism.

Referring to the drawings, the numerals 1 and 2 represent high and low pressure mains respectively of a distribution system with a regulator body 3 therebetween having a valve 4 therein which preferably is of the balanced type. The valve 4 is connected by a lever 5 to the operating stem 6 of a pressure responsive device indicated generally by the numeral 7. The pressure responsive device preferably comprises a case having a diaphragm 8 therein of suitable construction and a sealing diaphragm 9 to separate the fluid pressure responsive chamber 11 from the pressure within the regulator body 3, and the compartment above the diaphragm 8 is vented to the atmosphere in the usual manner. The diaphragm 8 is weighted in any suitable manner, as for example, by weight 12 which can be changed as desired.

Pilot control system

The pilot control system comprises a conduit 15 connected at one end to the high pressure main 1 and at the other end to the inlet 16 of an outlet pressure regulator 17 shown partly diagrammatically in Figure 1. This regulator 17 may be of any suitable construction and comprises principally a diaphragm 18 secured to a pivoted lever 19 having a valve member 21 at its opposite end for closing the inlet 16, the outlet 22 of the regulator connecting directly with the outlet chamber 20 under the diaphragm.

A conduit 25 leads from the outlet of regulator 17 to the inlet 26 of a regulator 27, and has a throttling orifice 28 interposed therein which may be fixed or adjustable as desired. Regulator 17 primarily serves to reduce the pressure in conduit 25 to some convenient value and when the pressure in main 1 is not too high for the diaphragm 8 and is fairly constant, regulator 17 may be omitted, if desired, conduit 25 being connected directly into main 1. A conduit 29 is connected to conduit 25 downstream from the orifice 28 and is connected to the control chamber 11 of the main regulator 7. The regulator 27 has a diaphragm 33 over an outlet chamber 30 and which is secured to a pivoted lever 31 having a valve member 32 at its opposite end for closing the inlet 26. The special construction and function of the regulator 27 will be hereinafter described. A conduit 34 is connected from the outlet 35 of the regulator to the low pressure main 2.

Pressure differential producing device

The low pressure main 2 has a pressure differential producing device, shown diagrammatically in Figure 1 as an orifice plate 38 and an inserted Venturi section 39 positioned adjacent the opening 41 in the orifice plate, in which the pressure head at the throat of the Venturi section varies as the square of the velocity of the gas at the throat in known manner. The construction of the inserted Venturi section is described in detail in United States Letters Patent No. 2,093,842, issued September 21, 1937, to Allen D. MacLean and Fritz Niesemann. However, any other type of device having a function dependent on velocity may be employed.

Referring to Figure 2, the pressure differential producing device is housed in a hollow cylindrical body member 42 inserted in the pipe line and clamped by bolts 43 between the flange 44 of the regulator body 3 and flange 45 of the adjacent pipe section of the low pressure main. The orifice plate 38 is secured by screws, or in any other suitable manner to the internal shoulder 46 of the insert 42. The insert has a hole 47 therein through which passes the pipe or conduit 49 connected by a vent 50 with the interior of the insert, and at the exterior end is secured a T fitting 51 which has inserted in one branch thereof a ported body member 52 with a longitudinal channel 53 therein terminating in a restricted portion at its end which forms a valve seat 54. The conduit 48 threaded at one end into the inserted Venturi section 39 communicates with a U-shaped pipe section 56 which in turn communicates with a suitably enlarged chamber 57 in the valve stem channel 58 of the bonnet member 59 threaded into the ported body member. A valve stem 60 extending through the channel 58 carries at its inner end the double seat needle valve 61 in a control chamber 62, tapered valve portions at its end fitting the seats 54 and 63. The valve stem has the valve operating member 64 which is graduated and may be read in connection with a suitable reference point on the bonnet. The conduit 48 communicates by the channel 53 and chamber 62 with the conduit 66, while the conduit 49 communicates with the conduit 67.

The outlet pressure regulator 68 has its inlet connected by a pipe 69 to the high pressure main 1. The regulator 68 is constructed exactly like regulator 17 and functions in the same way, and therefore need not be described in detail. A pipe 71 is connected to the outlet side of the regulator 68 and at its other end is connected to a mechanism known as a free vane controller contained in case 72. Between the regulator 68 and the free vane controller is an adjustable valve or orifice 73, a pipe 74 on the downstream side thereof being connected to the chamber 75 of the differential regulator 27, and another pipe 76 on the upstream side being connected to the chamber 77 of said regulator. Any change in the velocity of gas passing through orifice 73 will produce a pressure difference on opposite sides thereof, which pressure difference is conducted to the chambers 75 and 77 of the differential responsive regulator. The construction of the differential regulator is shown in detail in Figure 3.

Differential responsive regulator

The diaphragm 33 of the regulator 27 is secured between two diaphragm pans 78 and 79 which have central holes through which extends the threaded diaphragm stem 81. The stem 81 is threaded at its lower end 82 into the threaded hole 83 of the support 84, a washer 85 being located above the diaphragm pan 78 and the assembly being held in position by a nut 86. The outer periphery of the diaphragm is held between the flanged lower casing of the regulator and an intermediate flanged case 87 having a perforate top wall 88 located above the diaphragm 29. A second flanged case 89 having a perforate bottom wall 91 is secured above case 87. The stem 81 extends through a central opening 92 in the bottom wall 91 and has two nuts, 93, and washers 94 thereon, between which is clamped a sealing diaphragm 95. The outer periphery of this diaphragm 95 is clamped against the dividing wall 91 by a clamping ring 96 held thereon by screws 97 or in any other suitable manner. There is formed a sealed pressure chamber 77 between diaphragm 29 and wall 88 which has outside communication by the threaded pipe tap 99.

A second operating diaphragm 101 is secured at its outer periphery between the flanged case 89 and a cover 102 and at its center is clamped the operating stem 81 by diaphragm pans 103 and 104, nuts 105 and washers 106. Thus a second pressure chamber 75 is provided between diaphragm 101 and wall 91 which has outside communication by the threaded pipe tap 107. The cover 102 of the regulator has a suitable vent 108 therein, and receives a spring 109, the compression of which may be adjusted by a plug 111 threaded into the extension 112 of the cover.

The extension 112 may be sealed by a cap 113. The chambers 75 and 77 thus are subject to the differential pressure across orifice 73 which is created by the flow of fluid in pipe 71.

From the description so far pursued it will be seen that with a constant flow occurring through orifice 73 the valve 32 of the regulator 27 will become responsive solely to the pressure in main 2 communicated thereto by conduit 34, and regulator 7 will under such conditions function in known manner to maintain a constant pressure in the main 2. However, if the flow across orifice 73 is varied so as to vary the pressure differential across the orifice, the valve 32 will become responsive to this differential pressure and will cause regulator 7 to change the pressure in main 2 accordingly. If the rate of change of velocity across orifice 73 is such as to correspond at all times to the pressure changes in main 2 produced by regulator 7 in following the velocity changes across orifice 73, regulator 7 will operate without pulsation to gradually change the pressure in main 2. However, when in a given installation the regulator 7 pulsates the effect of the velocity change across orifice 73 is impressed on regulator 7 in such manner as to prevent pulsation. The manner in which this is done will now be described.

Vane controller

Conduit 71 is connected to a nipple 115 (Figure 6) passing through the case 72 and a tube 116 is suitably secured at one end to the nipple, the other end being connected to a nipple 117 secured in position by screws 119 passing through suitable bosses therein. The controller bracket has a shouldered recess 123 therein having a gasket 124 located on the shoulder. A nozzle case 125, Figures 6, 7 and 8, has a hollow boss 126 fitting the recess 123, the face thereof engaging the gasket 124 on the shoulder. A cross plate 127 secured by screws 128 in suitable bosses in the bracket 118 bears against the nozzle bracket and allows it to be swivelled about boss 126. A screw 129 passing through a lug 130 at the lower end of the nozzle case secures the nozzle case in adjusted position. A bore 131 in the bracket member communicates at one end with nipple 117 and at the other end with the recess 123, and a bore 132 in the nozzle member communicates with the bore 133 in the boss 126 and thereby forms a fluid connection with the tube 116.

The nozzle case is of general U shape, and has a boss 134 with a shouldered bore 135 therein which terminates in a restricted orifice, and a radial bore 139 connects with bore 138 and with groove 140 formed in the nozzle member. Passageway 132 connects with the groove 140. The nozzle 137 is secured in position with the flange 141 engaging gasket 136 by a threaded plug 142, a gasket 143 being interposed between the plug and nozzle member to prevent leakage from the bore 138. The opposite leg of the nozzle case has a shouldered recess 144 therein which is internally threaded and a flanged nozzle 145 having a threaded stem 146 is received in this bore. The nozzle member has a bore 147 therethrough and a radial bore 148 connects the bore 147 of the nozzle with the enlarged portion of recess 144. A longitudinal bore 149 in the leg of the U connects with the transverse passageway 151 and a bore 152 connects bore 135 with transverse bore 151.

From the foregoing description it will be apparent that fluid enters the free vane controller through the tube 116 passing down through the passageways 131, 132, 152, 151 and 149, and is discharged in two opposing jets from the nozzles 137 and 145. The controller is contained in a fluid tight case 153 having a cover 154 secured thereon and the fluid discharged from the nozzles is conveyed out of the case by the nipple 155 at the rear which connects with the conduit 156 whereby the flow is conducted back to the low pressure main 2.

The cover 154 has a bore 157 surrounded by a packing recess 158 through which passes a vane shaft 159, one end of the shaft being reduced and being journalled in the bore 160 in the boss 161 of the nozzle case 125. At its outer end the shaft carries an arm 162 secured thereto by a suitable set screw, and a roller 163 is suitably journalled at the end of the arm. A vane member 164 (Figures 6 and 9) is secured on the vane shaft 159 between threaded washers 165 and 166 and is held securely in place by a lock nut 167. The vane 164 is adjusted along the shaft 159 to pass between the nozzles 137 and 145. The vane has any desired shape, for example, in the form of an inverted T, and preferably one edge 168 of gradually changing radius so as to gradually uncover the nozzle outlets. It will be apparent that the position of the vane more or less obstructs the flow through the nozzles and thereby controls the rate of flow therethrough and through the conduit 71, and thus varies the differential pressure in conduits 74 and 76. The vane may be positioned exterior of the case by means of the arm 162.

The case 153 has a lug 169 at its upper end (Figure 6) in which is secured a rod 171 having a vertical bore 172 therethrough at its end, and a plunger 173 is guided by said bore for vertical reciprocating motion. A pin 176 passing through the plunger moves in slots (not shown) in the rod 171 and limits the movement thereof. Knurled washers 174 threaded onto the rod provide one abutment for spring 175, the other abutment being provided by the rod 171. The action of the spring therefore is to maintain the plunger 173 in its uppermost position as limited by the pin 176. The bottom of the plunger has a clevis 179 in which is suitably pivoted a bifurcated cam member 181. The upper end of the plunger rod 173 has a clevis 182 threaded thereon and a link 183 is pivotally secured thereto by a pin 184 passing through the clevis and a slot (not shown) in the link. A fulcrum rod 186 has a headed pivot pin 187 therein upon which the link 183 is journaled and the opposite end of the link is flattened at 188 and receives an impact screw 189 secured in position by a locknut 191.

A synchronous electric motor 193 is secured in the casing 72, and as this motor may be of any suitable construction it will not be described in detail. An interrupter wheel 194 has knobs 195 which engage the end of impact screw 189 to intermittently raise one end of the link 183 and depress the other end thereby periodically depressing the plunger 173 carrying the cam 181. The cam engages the roller 163 on arm 162 within the bifurcation, and depending on the angular position of the cam the arm 162 will be shifted periodically and thus will periodically shift the vane 164 to a corresponding position between the nozzles to vary the flow therethrough, and thus periodically vary the differential pressure across orifice 73.

The case 72 has a casing 201 at its rear to which is secured in any suitable manner a float chamber 202. A high pressure inlet 203 is provided in the float chamber and a tube on nozzle 204 communicates therewith and has a valve edge 205 at its upper end. The float 206 is substantially in the form of a bell and carries at its center a valve seat member 207 threaded therein and having a soft valve seat 208 secured thereto. A threaded valve seat member has a flange 209 from which extends a threaded stub 211. A washer 212 and a soft valve member 213 surround stub 211 and are held in position by a retainer 214 which in turn is held in position by the float rod 215 having a threaded bore to receive stub 211. Float rod 215 at its upper end is secured to a link 216 pivotally mounted in the casing to operate an indicator shaft 217. As the details of the indicator shaft operating mechanism are described and claimed in Patent No. 2,024,059, issued December 10, 1935, to Walter H. Parker, et al., it will not be described in detail. A shipping rod 218 holds the float against movement during shipping. A low pressure connection 219 is provided in the case and as the float chamber is partly filled with mercury, it will be apparent that the float is positioned in the mercury in accordance with the differential pressure existing on the inside and outside of the bell. The high pressure connection has a conduit 221 connected thereto which communicates with conduit 67 which in turn communicates with the interior of the low pressure main 2 adjacent the inserted Venturi section and a conduit 222 secured to the low pressure connection communicates with conduit 66 which in turn communicates with the throat of the inverted Venturi section.

The valve member 213 seats against seat 223 and prevents the escape of mercury from the float chamber when the pressure becomes too high, whereby communication between the high pressure and low pressure connections is cut off to prevent mercury blowing out of the float chamber. A ball check valve member 224 is provided which allows equalization of the pressures within the float chamber above the bell and the casing 201 when the pressure conditions return to normal so that the bell will not tend to stick in its uppermost position.

Movement of the recording shaft 217 operates the recording pen 225 which makes a differential pressure record on a chart adapted to be secured on pin 226 and rotated by clockwork in case 227. A collar 228 (Figures 12 and 13) is secured on the shaft 217 by a set screw 229 and a segment 231 is secured to the collar in any suitable manner. The adjusting arm 232 is secured to the collar to enable it to swivel thereabout, and has pin 233 swivelled thereon with a threaded bore extending therethrough. The segment 231 has a pin 234 swivelled thereon and an adjusting screw 235 is threaded through pin 233 and swivelled in pin 234 whereby the angular relation of segment 231 and arm 232 may be adjusted to adjust the recording pen 225 which is carried by the arm 232. A bracket 237 (Figures 12 and 14) has a snug fit on the recording shaft casing 238 and carries a U bracket 239 which is riveted or otherwise suitably secured thereto. A segmental arm 241 is pivotally secured to the U bracket by a pin 242 and the segmental arm 241 may be clamped in any desired position by a clamping screw 243 operating in a slot 244 in the arm. A wire 245 is bent at its ends and fits through a hole 246 in the segmental arm 241, the other end of the wire passing through a hole 247 in the cam member 181. (Figures 4 and 14). As the float 206 is positioned by the differential pressure existing across conduits 221 and 222, the arm 241 will be adjusted accordingly by its connection with the pen arm bracket 232 and will accordingly position the cam 181 in proper proportion to the differential pressure at the Venturi section 39, and when the cam 181 is depressed periodically by plunger 173 it engages roller 163 on arm 162 and positions vane 164 accordingly to vary the flow through orifice 73.

The boost limiting device comprises a cross conduit 251 in the T 51 connected with the conduit 49 at one end and at the other end with the inlet side of the back pressure regulator 252. Regulator 252, which is partly diagrammatically shown, contains a diaphragm 253 and provides a chamber 254 above the diaphragm which is open to the atmosphere and a chamber 255 under the diaphragm which communicates with conduit 251. The diaphragm 253 is loaded by an adjustable spring 256 or by any other suitable means and is connected to a valve 257 which controls communication between inlet pipe 251 and outlet conduit 258 connecting with the valve chamber 62. Thus it will be seen that valve chamber 62 can be connected with the pressure in the main 2 by closing conduit 53 by means of valve 61, or can be connected directly thereto by opening of valve 257. Ordinarily, valve 61 is positioned clear of seats 54 and 63 in order thereby to govern the rate of boost.

The operation of the apparatus now will be described. The differential pressure in the Venturi section 39 is transmitted by conduits 66, 222 and 67, 221 to the float 206 and positions the float in accordance therewith. The movement of float 206 is transmitted by rod 215 and arm 216 to indicator shaft 217, and shaft 217 positions segment 231 which positions cam 181 by the connecting wire 245. For initial adjustment the plunger rod 173 and cam 181 are held in the lower position with the roller 163 on arm 162 received in the cam bifurcation and the vane 164 thus is positioned between the nozzles 137 and 145 to allow the desired rate of flow therethrough and thus provide the desired differential pressure across orifice 73.

Regulator 27 has its outlet 35 connected by conduit 34 to the low pressure main and if it were not for chambers 75, 77 and their connections the valve 32 would open only when the pressure in main 2, connected by conduit 34 to chamber 30, falls below the load initially set by the spring 109 on the diaphragm 33. However, in setting up the apparatus for actual operating conditions, the differential across chambers 75 and 77 is taken into account in adjusting spring 109. Thus, if a minimum pressure of six inches water column is desired in the main 2 and a differential of one inch occurs across orifice 73 at initial setting of vane 164, the spring 109 should be set at about seven inches water column to cause the valve 32 to close by a six inch pressure in chamber 30 and open by a lesser pressure. Regulator 17 supplies fluid through conduit 25, stabilizing orifice 28 and conduit 29 to the chamber 11 under diaphragm 8 and valve 4 is responsive to the pressure in chamber 11. Regulator 17 is set to deliver any desired constant pressure, for example, eleven inches of water. As long as the pressure in main 2 remains at six inches, valve 32 remains closed and the pressure in chamber 11 keeps valve 4 closed. Assuming first a stable condition of demand in the low pressure main 2, the factor that determines the opening of valve 4 is the velocity V at the throat of the Venturi section 39 (upon which depends the static pressure at the throat of the Venturi section) and under suitable conditions, and assuming main 2 has a very small volume, when the withdrawal of gas from the main 2 increases slightly the regulator valve 4 will open only sufficiently to maintain a rate of flow V' through the Venturi section proportional to the withdrawal from the main and boost the pressure in the main 2 in an amount proportional to the square of the difference in velocities V and V'. Where the low pressure main has considerable capacity the regulator must not only supply gas to replace that being consumed but must supply a considerable additional flow to pack the line at the higher pressure necessary to provide a stable velocity through the Venturi section. This additional flow may occur over a long period of time at a relatively slow velocity or over a short period of time at a relative high velocity, depending on the resistance or lack of resistance to flow in the low pressure main and other factors. When this occurs over a short period of time at a high velocity, the flow through the Venturi section may accelerate at a greater rate than the corresponding acceleration of pressure in the main 2 with the result that the pressure in main 2 lags far behind what it would be under stabilized conditions for the flow actually passing through the Venturi section. By the time the acceleration of pressure has been brought into correspondence with the acceleration of flow through the Venturi section, the pressure in the line may have built up far beyond the desired boost. The flow through the Venturi section then may decelerate at a greater rate than it accelerated, thus causing the valve 4 to close relatively rapidly, and this valve will remain closed until the consumption of gas from the main 2 has reduced the pressure therein to the minimum setting. This action causes a very undesirable pulsation of the regulator valve.

In the present system the motor 193 periodically depresses plunger 173 to bring cam 181 into engagement with the roller on arm 162, but as long as the differential pressure across Venturi section 39 remains unchanged the cam 181 does not move arm 162. Should the demand increase in main 2 and thus cause an increased flow and increased differential across Venturi section 39, the segment 231 and wire 245 move cam 181 to a new position so that when the plunger 173 is next depressed the cam 181 will shift arm 162 and vane 164 and thus further uncover the openings of nozzles 137 and 145 and allow an increased flow across orifice 73. When the cam 181 rises the vane 164 is left in fixed position for a predetermined period and it will be seen that the differential pressure across orifice 73 conducted to chambers 75 and 77 is stabilized. The increased differential pressure in chambers 75 and 77 serves to counteract the spring 109 and opens valve 32, thus allowing gas to escape from conduit 29 and reducing the pressure in chamber 11 to cause valve 4 to open wider until the pressure in main 2 has built up to a sufficiently higher value to compensate for this unloading of spring 109. If, during this period any further changes in demand occur to cause a decrease in pressure in main 2, the pressure in chamber 30 will govern the action of valve 4 so that this valve 4 can operate to maintain a flow into main 2 equal only to the demand, and thus maintain said higher pressure in the main. Any corresponding change in flow in Venturi section 39 positions float 206 and cam 181 but does not affect the position of vane 164. However, on the next stroke of plunger 173 the cam 181 is moved to a new position corresponding to the flow through Venturi section 39, and the differential pressure across orifice 73 becomes stabilized at a new value so that valve 4 opens to increase the pressure in main 2 until a pressure is built up to compensate for this increased unloading of spring 109. Actually, the plunger 173 will be operated at intervals of about forty to ninety seconds so that the boosting steps are more gradual, but any desired frequency of operation of plunger 173 may be employed.

When the pressure in main 2 mounts too high, this pressure, which is communicated to the regulator chamber 255 through conduits 251 and 49 and 50 raises the diaphragm 253 to open the valve 257 which allows flow from the conduit 251 to the conduit 258 and valve chamber 57, thence by passage 53 and conduit 48 to the throat of the Venturi section 39 and equalizes the pressure across float 206. This returns cam 181 to initial position and on the next stroke of plunger 173 the vane 164 is returned to initial position. The differential across orifice 73 now decreases and valve 32 is closed by the pressure in chamber 30 and remains closed until the pressure in main 2 returns to the desired value.

By carrying out the boosting operation in successive steps hunting or pulsation of the regulator valve 4 is eliminated as the frequency of the boost steps can be adjusted to avoid resonating or oscillating system. The stepping down in pressure also is carried out in steps and likewise avoids pulsation of the regulator 4.

It will be understood that various modifications may be made in my invention without departing from the spirit or scope thereof. For example, chamber 11 may be connected directly with the throat of the Venturi section 39 instead of the arrangement shown in Figure 1, and a suitable valve in this connection may be periodically operated by a gas or electric motor to intermittently change the pressure in the chamber 11.

Having described my invention, what I claim and desire to secure by Letters Patent is:

1. In a fluid pressure regulating system, the combination of high and low pressure mains, a valve for controlling passage of fluid between said mains, a pressure responsive device having means connected to said valve to govern the operation thereof, a differential pressure producing device to produce a differential pressure responsive to gas velocity, a conduit connected between the pressure responsive device and said low pressure main whereby said pressure responsive device tends to maintain a constant pressure in said main, means to load said pressure responsive device by the differential pressure, and means for intermittently changing the differential pressure applied to said pressure responsive device.

2. In a fluid pressure regulating system, the combination of high and low pressure mains, a valve for controlling passage of fluid between said mains, a pressure responsive device having means connected to said valve to govern the operation thereof, a conduit for supplying fluid under pressure from the high pressure main to said pressure responsive device and discharging into the low pressure main, a pressure controlled valve in said conduit subject to the pressure in the low pressure main, a source of pressure differential, means to conduct the pressure differential to said pressure controlled valve to load the same at predetermined intervals and means to intermittently vary the differential impressed on said latter valve in accordance with the rate of flow in the low pressure main.

3. In a fluid pressure regulating system, the combination of high and low pressure mains, a valve for controlling passage of fluid between said mains, a pressure responsive device having means connected to said valve to govern the operation thereof, a conduit for supplying fluid under pressure from the high pressure main to said pressure responsive device and discharging into the low pressure main, a pressure controlled valve in said conduit subject to the pressure in the low pressure main, a second conduit carrying a flow of fluid, a pressure differential device in said second conduit, means to conduct the pressure differential to said pressure controlled valve to load the same, means to control the rate of flow in said second conduit, intermittently actuated means for positioning said latter means, and means dependent on the rate of flow in the low pressure main to locate said positioning means.

4. In a fluid pressure regulating system, the combination of high and low pressure mains, a valve for controlling passage of fluid between said mains, a pressure responsive device having means connected to said valve to govern the operation thereof, a conduit for supplying fluid under pressure from the high pressure main to said pressure responsive device and discharging into the low pressure main, a pressure controlled valve in said conduit subject to the pressure in the low pressure main, a second conduit carrying a flow of fluid, a pressure differential device in said second conduit, means to conduct the pressure differential to said pressure controlled valve to load the same, a vane to control the rate of flow in said second conduit, intermittently actuated means for positioning said vane, and means dependent on the rate of flow in the low pressure main to locate said positioning means.

5. In a fluid pressure regulating system, the combination of high and low pressure mains, a valve for controlling passage of fluid between said mains, a pressure responsive device having means connected to said valve to govern the operation thereof, a conduit for supplying fluid under pressure from the high pressure main to said pressure responsive device and discharging into the low pressure main, a pressure controlled valve in said conduit subject to the pressure in the low pressure main, a second conduit carrying a flow of fluid, a pressure differential device in said second conduit, means to conduct the pressure differential to said pressure controlled valve to load the same, a vane to control the rate of flow in said second conduit, feeler means for positioning said vane, means dependent on the rate of flow in the low pressure main to position said feeler means, and means for intermittently engaging said feeler means to position said vane.

6. In a fluid flow regulating system, the combination of high and low pressure mains, a valve for controlling passage of fluid between said mains, a pressure responsive device having means connected to said valve to govern the operation thereof, a conduit for supplying fluid under pressure from the high pressure main to said pressure responsive device and discharging into the low pressure main, a pressure controlled valve in said conduit subject to the pressure in the low pressure main, a second conduit carrying a flow of fluid, a pressure differential device in said second conduit, means to conduct the pressure differential to said pressure controlled valve to load the same, a vane to control the rate of flow in said conduit, a pressure differential producing device in said low pressure main, a manometer tube, a float in said manometer tube, means to impress the pressure differential developed in the low pressure main on said float, a shaft, means connecting said float and shaft, a feeler cam connected to said shaft, and a synchronous electric motor for intermittently moving said cam for positioning said vane.

7. In a fluid flow regulating system, the combination of high and low pressure mains, a valve for controlling passage of fluid between said mains, a pressure responsive device having means connected to said valve to govern the operation thereof, a conduit for supplying fluid under pressure from the high pressure main to said pressure responsive device and discharging into the low pressure main, a pressure controlled valve in said conduit subject to the pressure in the low pressure main, a second conduit carrying a flow of fluid, a pressure differential device in said second conduit, means to conduct the pressure differential to said pressure controlled valve to load the same, a vane to control the rate of flow in said conduit, a pressure differential producing device in said low pressure main, a manometer tube, a float in said manometer tube, means to impress the pressure differential developed in the low pressure main on said float, a shaft, means connecting said float and shaft, a plunger rod, a feeler cam carried by the plunger rod and connected to said shaft, and means for intermittently moving said plunger rod for positioning said cam.

8. In a fluid flow regulating system, the combination of high and low pressure mains, a valve for controlling passage of fluid between said mains, a pressure responsive device having means connected to said valve to govern the operation thereof, a conduit connected to the low pressure main and to said pressure responsive device to control the operation thereof, a pressure controlled valve in said conduit subject to the pressure in the low pressure main, a source of pressure differential, means to conduct the pressure differential to said pressure controlled valve to load the same, means positioned by the rate of flow in the low pressure main to change said pressure differential, and means for intermittently operating said pressure differential changing means.

9. In a fluid pressure regulating system, a low pressure main, a plurality of high pressure mains, a plurality of valves for controlling passage of fluid from said high pressure mains to said low pressure main, pressure responsive devices having means connected to said valves respectively to govern the operation thereof, means for supplying fluid under pressure to control the operation thereof, differential pressure producing devices responsive to gas velocity, means to transmit the differential pressure produced across the differential pressure producing devices to control the pressure responsive devices respectively and means to intermittently change said differential pressure transmitted to said pressure responsive devices.

10. In a fluid pressure regulating system, the combination of high and low pressure mains, a valve for controlling passage of fluid between said mains, a pressure responsive device to control the operation thereof, a differential pressure producing device responsive to gas velocity, means to apply the differential pressure so produced to automatically load the pressure responsive device, and means to intermittently connect and disconnect the differential producing device and the pressure responsive device.

11. In a fluid pressure regulating system, the combination of a high and low pressure main, a valve for controlling passage of fluid between said mains, a pressure controlling device for the low pressure main, a differential producing device responsive to flow rate, means for influencing the pressure controlling device by the differential producing device, and means to alternately connect and disconnect the pressure controlling device with the differential responsive device, and means to control the relative length of time of connection and disconnection.

12. In a fluid pressure regulating system, the combination of high and low pressure mains, a valve for controlling passage of fluid between said mains, a pressure responsive device providing two chambers and having means connected to said valve to govern the operation thereof, means for supplying a flow of gas to one of said chambers to produce a pressure effect on said pressure responsive means, means responsive to gas velocity in said low pressure main to produce a differential pressure, and means responsive to said differential pressure to vary said flow of gas to said chamber, and means intermittently disconnecting said differential pressure from said latter responsive means to periodically stabilize said valve.

13. In a fluid pressure regulating system, the combination of high and low pressure mains, valve means controlling passage of fluid between said mains, pressure responsive means to govern the operation of said valve, and means intermittently operated to load said pressure responsive means in accordance with the rate of flow in the low pressure main.

14. In a fluid pressure regulating system, the combination of high and low pressure mains, valve means controlling passage of fluid between said mains, a pilot operated pressure responsive means to govern the operation of said valve, means for loading said pressure responsive means in accordance with the flow in the low pressure main, and means for intermittently stabilizing said loading means.

15. In a fluid pressure regulating system, the combination of high and low pressure mains, a valve controlling passage of fluid between said mains, a pressure responsive device having operating means connected to said valve, a conduit including an outlet pressure regulator for supplying fluid under pressure from the high pressure main at a predetermined pressure to said pressure responsive device to control the operation thereof and discharging into the low pressure main, a valve in said conduit, means responsive to the pressure in the low pressure main for controlling said valve, a source of low pressure, and means for intermittently impressing said low pressure upon said latter means for loading the same.

16. In a fluid pressure regulating system, the combination of high and low pressure mains, a valve for controlling passage of fluid between said mains, a pressure responsive device having valve operating means connected to said valve, a conduit for supplying fluid under pressure to said pressure responsive device to control the operation thereof, valve means in said conduit for relieving the pressure therein, a source of low pressure, means responsive to the source of low pressure for controlling said latter valve, means for intermittently applying said low pressure to said latter means, and means for controlling the time interval of operation of said intermittent means.

17. In an apparatus of the character described, the combination of high and low pressure mains, valve means controlling passage between said mains, a pressure responsive device having means connected to said valve, a conduit for supplying fluid pressure to said pressure responsive device to control the operation thereof, a relief valve in said conduit, a differential pressure producing device, and means for loading said relief valve by the differential pressure at predetermined intervals, comprising a uniformly operating motor, a conduit between said relief valve and differential pressure producing device, and valve means in said latter conduit intermittently operated by said motor.

18. In a fluid pressure regulating system, the combination of high and low pressure mains, valve means controlling passage of fluid between said mains, pressure responsive means to govern the operation of said valve, a conduit including an outlet pressure regulator for supplying fluid under pressure from the high pressure main at a predetermined pressure to said pressure responsive means, a second outlet pressure regulator in said conduit for venting the pressure therein, a source of differential pressure, and means for intermittently impressing said differential pressure upon said outlet pressure regulator for controlling the pressure in said conduit.

19. In a fluid pressure regulating system, the combination of high and low pressure mains, a valve controlling passage of fluid between said mains, a pressure responsive device having operating means connected to said valve, a conduit for supplying fluid under pressure to said pressure responsive device to control the operation thereof, an outlet pressure controlled relief valve in said conduit comprising a casing having an inlet connected to said conduit and an outlet, a valve for controlling flow between said inlet and outlet, a diaphragm connected to said valve and providing a control chamber in direct communication with said outlet, a dividing wall providing a confined chamber on the opposite side of said diaphragm, a second diaphragm providing a confined chamber on the opposite side of said dividing wall, means connecting said diaphragms for conjoint movement, means for sealing said connecting means with relation to said dividing wall, a source of differential pressure, and means intermittently connecting said differential pressure across said dividing wall.

ALLEN D. MacLEAN.